April 28, 1970 L. D. HOWE, JR., ET AL 3,509,366

DATA POLARITY LATCHING SYSTEM

Filed Feb. 23, 1967 2 Sheets-Sheet 1

INVENTORS
LELAND D. HOWE, JR.
JAMES T. MOYER

BY [signature]
AGENT

United States Patent Office 3,509,366

Patented Apr. 28, 1970

3,509,366

DATA POLARITY LATCHING SYSTEM

Leland D. Howe, Jr., Tioga Center, and James T. Moyer, Endicott, N.Y., assignors to International Business Machines Corporation, Armonk, N.Y., a corporation of New York Filed Feb. 23, 1967, Ser. No. 618,189
Int. Cl. H03k *19/22, 19/40*
U.S. Cl. 307—218 13 Claims

ABSTRACT OF THE DISCLOSURE

This is a transistorized-latch circuit which stores the polarity of input data and is operable under a control gate, wherein a positive gate and a data signal will determine the condition of the output signal. The output can change only when the gate is positive. If the gate is positive and the data positive, the output will be positive and remain positive after the gate goes negative. If the gate is positive and the data is negative, then the output will be negative and remain negative after the gate goes negative.

BACKGROUND OF THE INVENTION

This invention is directed to the improvements in the arrangement of transistorized circuitry for the storage of polarity reresentations of data input signals in a data processing system.

A latch circuit is known as a bistable circuit having two inputs and shiftable from one of its stable states to the other and returning in response to input signals applied alternately to the two inputs. That is to say, an input signal at one input latches the circuit in a particular one of its stable states, and it is not released from that stable state, and it is not released from that stable state to its other stable state until a signal is received at the the opposite input. Data latching systems for use with data processing systems have also been devised wherein logic "or" and logic "and" circuitry is employed to effect the data latching function. A logic "or" circuit is characterized by having two or more inputs and wherein an output signal is produced when an input signal is received on at least one of its input leads. A logic "and" circuit is characterized by having two or more inputs and wherein an output signal is produced when, and only when, input signals are received on all of the input leads.

Another problem frequently encountered in latching circuitry is a condition identified as "race." "Race" is defined as a premature response to input signals by a logical element due to the fast operation of the elements in conjunction with other elements of the circuit.

It is desirable to improve logic circuit operation with respect to switching time, signal response, number of circuit elements and reliability of operation, thereby to increase the flexibility, versatility and capability of data processing systems. A means for realizing these advantages is through improved logical circuitry and interconnection. Such logic circuitry should utilize relatively few active elements and be suitable for microminiaturization. It is desirable, therefore, to improve the performance and interconnection of logical circuitry in an effort to provide high speed, polarity-hold latch circuitry that will satisfy the requirement of present and future-day data processing systems.

SUMMARY OF THE INVENTION

A general object of the invention is to provide an improved polarity-hold latch circuit having improved signal response characteristics.

Another object of the invention is to provide an improved polarity-hold latch having fewer active elements and more rapid switching speeds.

Another object of the invention is to provide an improved polarity-hold latch responsive to low power input signals.

Still another object of the invention is to provide an improved polarity-hold latch having improved anti-race characteristics.

In accordance with the present invention, the polarity-hold latch is a unique configuration comprising three "plus or" circuits functioning as the polarity-hold elements. The latch configuration operates under the control of a "plus" gate with the data signal determining the condition of the output. The output can only be changed when the gate is positive. If the gate is positive and the data positive, then the output will be positive and remain positive even after the gate goes negative. If the gate is positive and the data is negative, then the output will be negative and remain negative even after the gate goes negative. Optionally, a D.C. reset can be provided with this latch which functions to reset the output to a negative condition.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
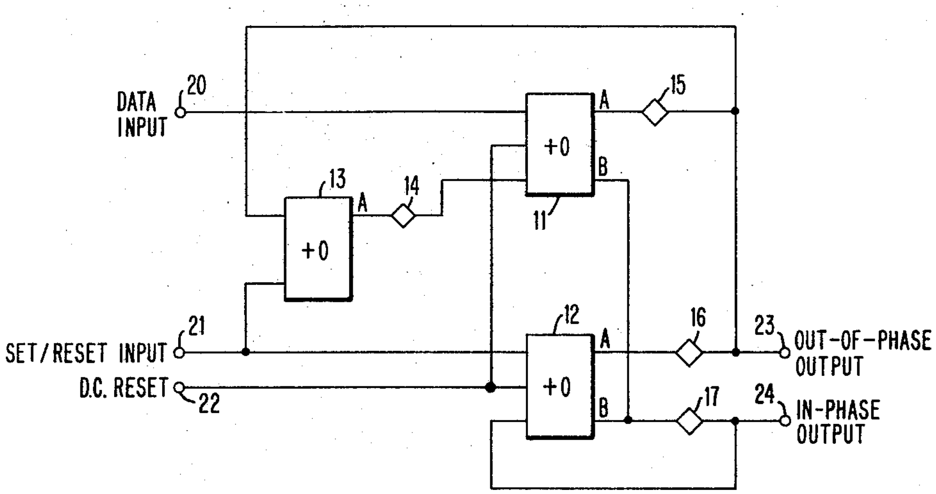
FIG. 1 is a schematic block diagram of the latch logic providing a unique polarity-hold latch in accordance with the invention.
Figure 3:
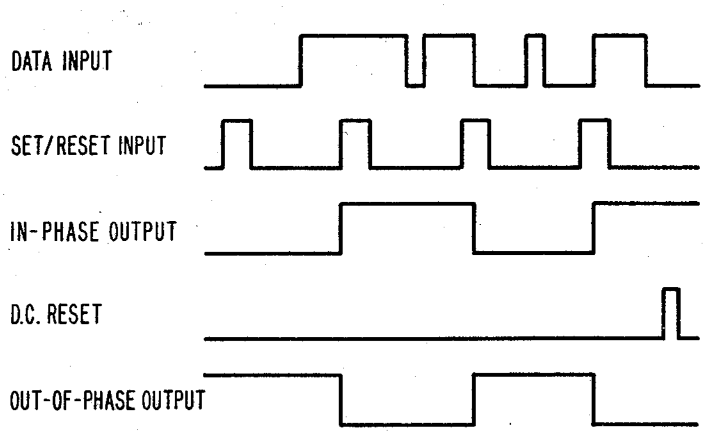
FIG. 3 is a timing diagram of the input and output waveforms for the polarity-hold latch.

Referring to FIG. 1, there is shown a schematic block diagram for a data polarity-hold latching system comprising three "or" logic blocks 11, 12 and 13 and the emitter followers 14, 15, 16 and 17 arranged in accordance with the preferred embodiment of the instant invention. In the system of notation used herein, a positive "or" logic block is characterized as a transistorized current switch which produces a plus in-phase output with any input which is positive and a minus out-of-phase output. Thus, any positive input to the "or" circuit will produce a plus in-phase output at the B terminal and a minus out-of-phase output at the A terminal.

The emitter followers 14 through 17 function to provide a proper voltage level and current availability to operate other current switches which actually perform the logic gating. The emitter followers, in practice, are attached to the outputs of a current switch so that one combination current switch-emitter follower circuit may control single inputs of several similar combined circuits. The details of these schematic block representations will become more apparent as the detailed description proceeds.

Figure 2:
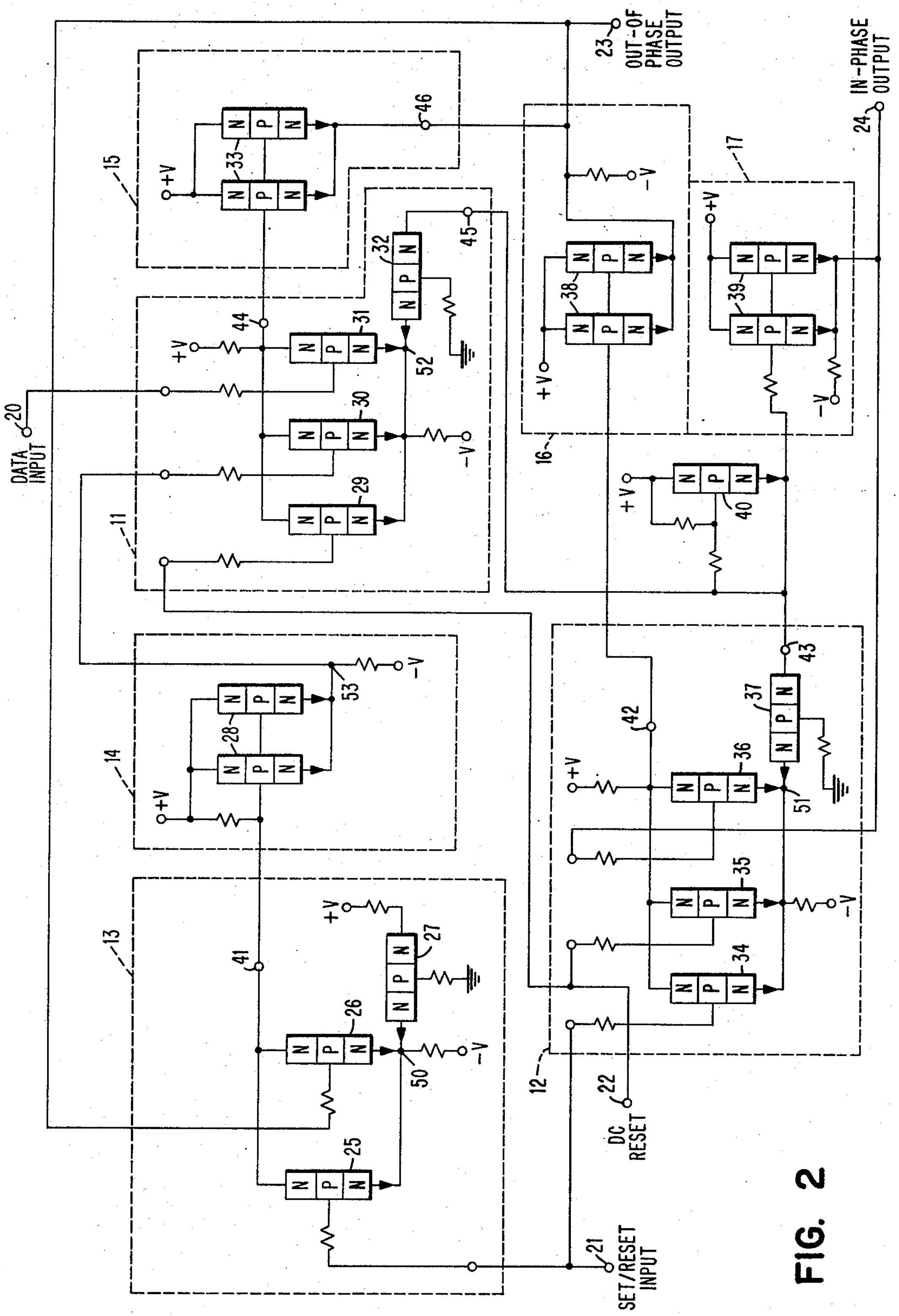
FIG. 2 is a diagram of the circuit details capable of providing a unique polarity-hold latch in accordance with the invention.

In order to clarify the operation of the data polarity-hold latch circuitry, reference should be had to FIG. 2. We may assume the D.C. reset line 22 to be in a down condition. This will insure transistors 35 and 29 to be in the "off" condition and will not have any affect in the circuit operation.

When the set/reset line 21 is in an up condition, the in-phase output at terminal 24 will follow the level of the data input terminal 20. The set/reset line 21 being at an up level, causes transistors 34 and 25 to be turned "on" which will cause the terminals 41 and 42 to go to a down level, and points 50 and 51 to go to an up level thereby functioning as an inverter. Terminal 42 going to a down level will cause transistors 38 to attempt to establish a down level at terminal 23, but the level established at terminal 23 will depend upon transistors 33. Point 51 going to an up level causes transistor 37 to be turned "off," the level at terminal 43 now depending upon transistor 32. Terminal 41 going to the down level causes transistors 28 to establish a down level at point 53 which turns transistor 30 "off." Since both of the transistors 29 and 30 are "off," the level at terminal 44 and point 52 will be entirely dependent upon transistor 31 which is controlled by the data input applied to terminal 20.

If the data input at terminal 20 is at a down level, transistor 31 will be "off," point 44 will be at an up level and point 52 at a down level because transistors 29 and 30 are in an "off" condition. Transistors 33 will then establish an up level at the out-of-phase output terminal 23. This up level condition will turn transistor 26 "on," but this will not change the level at point 41 since transistor 25 is in an "on" condition. Transistor 32 will turn "on" and will cause terminal 45 to go to a down level and transistors 39 will establish a down level at the in-phase output terminal 24. This down level will turn the transistor 36 to an "off" condition, but terminal 42 and point 51 will not change since transistor 34 is in an "on" condition. When the set/reset line 21 is now changed to a down level, the outputs will retain their present levels. The set/reset line 21 going to a down level will cause transistors 34 and 25 to turn "off." Transistor 25 in turning "off" will cause no change in the level at terminal 41 and point 50 since transistor 26 is in an "on" condition. Transistor 34 in turning "off" will cause terminal 42 to go to an up level and point 51 to go to a down level. Terminal 42 going to the up level will cause transistors 38 to establish an up level at the out-of-phase output terminal 23, but the out-of phase output is already at an up level and no change will result. Point 51 going to a down level will turn on transistor 37, but this will not change the level at terminal 43 since it is already down. Now if the data input at terminal 20 should change to an up level, transistor 31 will turn "on" and terminal 44 will go to a down level and point 52 to an up level. Terminal 44 being down will cause transistors 33 to try to establish a down level at the out-of-phase output terminal 23, but transistors 38 are establishing an up level which dominates and the out-of-phase output at terminal 23 will not change. Point 52 going to an up level causes transistor 32 to turn "off," but transistor 37 is in an "on" condition and maintains the down level at terminal 43.

The transistor collector connections have operational restrictions because additional current requirements through the collector resistor can change the collector voltage to such a level as to cause saturation of the transistor which would slow circuit recovery. Thus, only one set of input transistors per current switch or one grounded base transistor can be conducting at any time. If a clamp circuit such as the one employing transistor 40 is used in place of the collector resistor, the above-mentioned restriction can be relaxed to allow simultaneous conduction in two current switch groups.

Returning now to the previous condition wherein the set/reset input line 21 is at an up condition, if the data input at terminal 20 is at an up level, transistor 31 will be "on," terminal 44 will be at a down level and point 52 at an up level. Transistors 33 will attempt to establish a down level at the out-of-phase output terminal 23. This down level will be established as transistors 38 are also attempting to establish a down level. This down level will turn "off" transistor 26, but terminal 41 and point 50 will not change since transistor 25 is in an "on" condition. Transistor 32 will turn "off" causing terminal 45 to go to an up level. Terminal 45 going to an up level will cause transistors 39 to establish an up level at the in-phase output terminal 24. This up level will cause transistor 36 to turn "on," but terminal 42 and point 51 will not change as transistor 34 is in an "on" condition. When the set/reset line 21 is changed to a down level, the outputs will retain their present levels. The set/reset line 21 going down will cause transistors 34 and 25 to turn "off." Transistor 34 will cause no change at the terminal 42 and point 51 as transistor 36 is "on." Transistor 25 turning "off" will cause terminal 41 to go to an up level and point 50 to go to a down level and functioning as an inverter. Terminal 41 going up will cause transistors 28 to establish an up level at terminal 53 which will turn transistor 30 "on." Transistor 30 turning "on" will not change either terminal 44 or point 52 as transistor 31 is in an "on" condition. Now if the data input at terminal 20 should change to a down level, transistor 31 will turn "off." There will be no change in terminal 44 or point 52 as transistor 30 is in an "on" condition.

In summary, it has been shown how the latch retains the polarity of the data input terminal 20 at the time when the set/reset line 21 goes down from its up level.

In order to show that no spurious outputs are given when the set/reset line 21 raises to an up level and the data input line 20 does not require the polarity-hold latch to change, both states of the latch will now be considered. First, we may assume that the out-of-phase output at terminal 23 is at an up level, the in-phase output at terminal 24 is at a down level, the data input terminal 20 is at the down level, the set/reset line 21 is at a down level, and the D.C. reset line 22 is at a down level. These conditions will establish the condition of all transistors and points within the polarity-hold latch circuit. Now, when the set/reset line 21 goes to an up level, transistors 34 and 25 will turn "on." Transistor 25 turning "on" will not change the condition at terminal 41 and point 50 as transistor 26 is in an "on" condition. Transistor 34 in turning "on" will cause terminal 42 to go to a down level and point 51 to an up level, Terminal 42 in going to a down level will cause transistors 38 to attempt to establish a down level on the out-of-phase output at terminal 23, but this terminal will stay at an up level due to transistors 33. Point 51 going to a down level will turn "on" transistor 37, but terminal 43 will not change because transistor 32 is in an "on" condition. Hence, no spurious output occurs for this condition.

Next, we may assume the out-of-phase output terminal 23 is at a down level, the in-phase output terminal 24 is at an up level, the data input terminal 20 is at an up level, and the set/reset line 21 is at a down level. These conditions will establish the conditions of all transistors and points in the polarity-hold latch circuit. Now, when the set/reset line 21 goes to an up level, transistors 34 and 25 will turn "on." Transistor 34 in turning "on" will not change the condition at terminal 42 and point 51 as transistor 36 is in an "on" condition. Transistor 25 in turning "on" will cause terminal 41 to go to a down level. Terminal 41 is going to a down level will cause transistors 28 to establish a down level at terminal 53. This down level will turn "off" transistor 30. Transistor 30 turning "off" will not change the condition at terminal 44 and point 52 as transistor 31 is in an "on" condition. Hence, no spurious outputs will occur for this condition.

A D.C. reset line 22 has been provided in order to reset the polarity-hold latch to a known state without using the set/reset line 21. With the set/reset line 21 at a down level, the D.C. reset level is raised to an up level wihch will turn "on" transistors 35 and 29. Transistor 35 in turning "on" will cause terminal 42 to go to a down level and point 51 to an up level. Terminal 42 in going to a down level will cause transistors 38 to attempt to establish a down level at the out-of-phase output terminal 23. Point 51 in going to an up level will cause transistor 37 to turn "off." Transistor 29 in turning "on" will cause terminal 44 to go to a down level and point 52 to an up level. Terminal 44 in going to the down level will cause transistors 33 to attempt to establish a down level at the out-of-phase output terminal 23. The out-of-phase output will be down because transistors 38 and 33 are trying to establish the down level. Point 52 in going up will turn transistor 32 "off" which in turn will cause terminal 45 to go to an up level since transistor 37 is in an "off" condition. Terminal 45 in going to an up level will cause transistors 39 to establish an up level at the in-phase output terminal 24. The in-phase output being up will cause transistor 36 to turn "on," but terminal 42 and point 51 will not change since transistor 35 is in an "on" condition. The down level at the out-of-phase output terminal 23 will turn transistor 26 "off" which in turn will cause terminal 41 to go to an up level since transistor 25 is in an "off" condition. Terminal 41 in going to an up level will cause transistors 28 to establish an up level at terminal 53 which will turn transistor 30 "on." Transistor 30 turning "on" will not change terminal 44 and point 52 since transistor 29 is in an "on" condition. Now, when the D.C. reset line 22 is changed to a down level, transistors 35 and 29 will turn to an "off" condition. Transistor 35 in turning "off" will not change the condition at terminal 42 and point 51 since transistor 36 is in an "on" condition. Transistor 29 in turning "off" will not change the condition at terminal 44 and point 52 since transistor 30 is in an "on" condition. Thus, the state established by the D.C. reset line 22 is that of the out-of-phase output terminal 23 being at a down level and the in-phase output at terminal 24 being at an up level.

This polarity-hold latch circuit has several advantages over the common latch which requires both a set and a reset line. Only one timing pulse is necessary rather than two. Also, the state of the latch is determined at the transition of the set/reset line 21 from an up level to a down level, which allows more time for the data input at terminal 20 to become valid. The data input has to be good for a predetermined time, depending upon circuit speeds, before and after the transition occurs. With the common latch using set and reset lines, the data in general must be good for a period of time which overlaps the set pulse.

The polarity-hold latch of the subject invention will not give spurious outputs when the set/reset line 21 is pulsed. The latch herein discussed does not have the timing problems or race conditions which depend upon the speed of some circuits being faster or slower than some other circuits in combination with the latch. The circuitry herein disclosed is less expensive and offers substantial cost reduction over other known types of latches and latch logic circuitry.

While the invention has been particularly shown and described with reference to a preferred embodiment thereof, it will be understood by those skilled in the art that the foregoing and other changes in form and details may be made therein without departing from the spirit and scope of the invention.

We claim:

1. A data polarity latch circuit comprising:

(a) a source of input data signals;

(b) a source of gating signals;

(c) a first logic "or" circuit of at least the two input type and responsive to said source of input data signals;

(d) a transistorized inverter circuit responsive to said source of gating signals and coupled to one of the inputs to said first logic "or" circuit; and (e) a second logic "or" circuit of at least the two input type and responsive to said source of gating signals and having an out-of-phase output coupled with an out-of-phase output of said first logic "or" circuit and functioning to provide a complement output from the latch circuit configuration and having an in-phase output coupled with an in-phase output of said first logic "or" circuit and functioning to provide an in-phase output from the latch circuit configuration relative to input data signals, which is characterized by the condition that the outputs can only be changed when the gate is present and that the outputs will remain in the set condition after the gate has been removed.

2. A data polarity latch circuit as in claim 1 further including:

(a) a first emitter follower in the out-of-phase output of said first logic "or" circuit;

(b) a second emitter follower in the out-of-phase output of said second logic "or" circuit and with the outputs of said first and second emitter followers being coupled together to provide a complement output from the polarity latch circuit configuration; and (c) a third emitter follower coupled in the in-phase output line of said first and second logic "or" circuits and functioning to provide an in-phase output from the polarity latch circuit configuration.

3. A data polarity latch circuit as in claim 2 further including a connection between the output of said third emitter follower and an input to said second logic "or" circuit which functions as a feedback means.

4. A data polarity latch circuit as in claim 3 wherein the first and second logic "or" circuits are of the positive "or" type.

5. A data polarity latch circuit comprising:

(a) a source of input data signals;

(b) a source of gating signals;

(c) a first logic "or" circuit of at least the two input type and responsive to said source of input data signals;

(d) a second logic "or" circuit of at least the two input type and responsive to said source of gating signals and having an out-of-phase output relative to a gate signal input coupled to one of the inputs of said first logic "or" circuit;

(e) a third logic "or" circuit of at least the two input type and responsive to said source of gating signals and having an out-of-phase output coupled with an out-of-phase output of said first logic "or" circuit relative to an input data signal and functioning to provide a complement output from the latch circuit configuration and having an in-phase output coupled with an in-phase output of said first logic "or" circuit and functioning to provide an in-phase output from the latch circuit configuration which is characterized by the condition that the output can only be changed when the gate is present and that the output will remain in the set condition after the gate has been removed.

6. A data polarity latch circuit as in claim 5 further including:

(a) a first emitter follower in the out-of-phase output of said first logic "or" circuit;

(b) a second emitter follower in the third logic "or" circuit and with the outputs of said first and third emitter followers being coupled together to provide the complement output from the latch circuit configuration; and (c) a third emitter follower coupled in the in-phase output from said first and third logic "or" circuits to provide the in-phase output from the latch circuit configuration.

7. A data polarity latch circuit as in claim 6 further including a fourth emitter follower coupled between the out-of-phase output from said second logic "or" circuit to the input of said first logic "or" circuit.

8. A data polarity latch circuit as in claim 7 further including a connection from the output of said third emitter follower to an input to said third logic "or" circuit and functioning as a feedback means.

9. A data polarity latch circuit as in claim 8 further including a coupling means from said complement output to an input of said second logic "or" circuit.

10. A data polarity latch circuit as in claim 8 wherein the logic "or" circuits are of the positive "or" type.

11. A data polarity latch circuit as in claim 8 wherein the logic "or" circuits are all transistorized.

12. A data polarity latch circuit as in claim 11 wherein the transistors used are of the NPN type.

13. A data polarity latch circuit as in claim 12 further including reset means coupled to an input of both said first and third logic "or" circuits which serve to set said first and third logic "or" circuits to a predetermined condition in response to reset pulses applied to said reset means.

References Cited

UNITED STATES PATENTS

| | | | |
|---|---|---|---|
| 3,086,128 | 4/1963 | Litwiller | 307—289 |
| 3,339,145 | 8/1967 | MacSorley | 307—218 |
| 3,381,232 | 4/1968 | Hoernes et al. | 307—289 |

JOHN S. HEYMAN, Primary Examiner

B. P. DAVIS, Assistant Examiner

U.S. Cl. X.R.

307—289, 214; 328—94